United States Patent [19]

Coughlin

[11] Patent Number: 4,515,844

[45] Date of Patent: May 7, 1985

[54] DELSOLITE

[75] Inventor: Thomas E. Coughlin, Tyngsboro, Mass.

[73] Assignee: Nylco Corporation, Nashua, N.H.

[21] Appl. No.: 590,960

[22] Filed: Mar. 19, 1984

[51] Int. Cl.³ .......................... B32B 3/02; B32B 5/06; B32B 5/22
[52] U.S. Cl. ..................................... 428/82; 156/148; 428/300; 428/314.4; 428/317.1; 428/318.6
[58] Field of Search ...................... 428/82, 317.1, 300, 428/318.6, 304.4, 314.4, 314.8, 316.6; 156/148

[56] References Cited

U.S. PATENT DOCUMENTS

| 3,352,739 | 11/1967 | Blue | 428/316.6 |
|---|---|---|---|
| 3,661,674 | 5/1972 | Higgs et al. | 428/304.4 |
| 4,062,993 | 12/1977 | Seward et al. | 428/138 |
| 4,197,343 | 4/1980 | Forsythe | 428/300 |
| 4,435,458 | 3/1984 | Hill | 428/304.4 |

Primary Examiner—William J. Van Balen
Attorney, Agent, or Firm—Thompson, Birch, Gauthier & Samuels

[57] ABSTRACT

Footwear insulation material comprising a urethane membrane bonded to a foam layer by an adhesive system. Needle punched fibers are secured to the membrane and extend through and beyond the foam layer. Insulation material has a thermal insulation factor R of between about R18.0 to R19.0.

17 Claims, 1 Drawing Figure

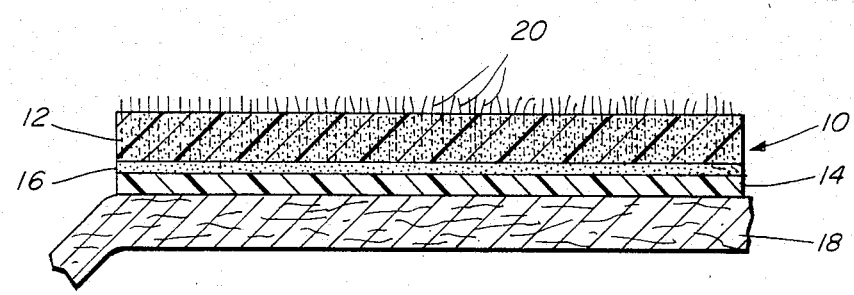

DELSOLITE

BACKGROUND AND BRIEF SUMMARY OF THE INVENTION

This invention relates to laminated footwear insulation material.

In outdoor recreational footwear, proper insulation is particularly important. Such insulation should have the properties of low thermal conductivity, breathability and moisture resistance. In addition to these properties, footwear insulation material should also be characterized by a wide range of mechanical properties, such as tensile strength, elasticity, cold temperature flexibility and abrasion resistance.

Several insulation materials in use today exhibit, some of these properties but often such materials are only effective in compositions too heavy or too bulky for practical footwear application. Insulation materials which may have the desired lightweight composition or thinness do not possess the required insulating properties.

Thus, there is a need for an extremely thin effective insulating material having superior thermal insulation and moisture vapor transmission characteristics; and also exhibiting the necessary mechanical properties.

The present invention is directed to an insulation composition and method of producing the same. Broadly the invention comprises a urethane membrane secured to a foam layer by an adhesive system. A plurality of needle punched fibers are secured to the membrane and extend through and beyond the foam layer. The material has a thermal insulation factor R of between about R18.0 to R19.0 based on ASTM C-177-76 and is substantially liquid impermeable—gas and moisture vapor permeable. The moisture vapor transmission factor measured according to PSTC-34(11/70) ranges between 0.35 to 0.65.

More particularly, the composition comprises a polyurethane membrane which is adhesively joined to a polyurethane foam. The foam has a density of 1.0 to 2.3 pounds per cubic foot, say for example 1.5 to 1.8 pounds per cubic foot. The foam and membrane are needle punched with polymeric fibers of between 2 to 6 denier, say for example 4 denier and between about 600 to 1400 punches per square inch, say preferably between 800 to 1000 punches per square inch, for example between 860–900 punches per square inch. The composition is impermeable to liquids but is gas and vapor permeable. The present invention embodies an extremely thin laminated insulating material wherein the foam is between 0.030–0.090 inch, say for example 0.050–0.70 inch, preferably 0.060 inch gauge, and the membrane to which it is adhered is between 0.0008–0.0012 inch, preferably 0.001 inch.

The superior thermal insulating properties of the composition are complemented by superior mechanical properties. The composition has tensile strength of 3000 psi at 500% elongation, excellent humid aging 160° F. at one week (80%–95% R.H.) and cold temperature flexibility at −65° F. FED-STD-191, Method 5874. The composition has an elongation of approximately 800% before breaking ASTM D2370. In the preferred embodiment, a layer of polyurethane foam, either open cell or closed cell, is joined to a cast urethane membrane by an adhesive system. A plurality of polypropylene fibers are needle punched into the membrane and pass through and extend beyond the foam layer.

Other additives may be incorporated into the composition to provide antifungal and antibacterial characteristics.

BRIEF DESCRIPTION OF THE DRAWING

The FIGURE is a cross section of a composition embodying the invention.

DESCRIPTION OF THE PREFERRED EMBODIMENT

Referring to the FIGURE, a composition 10 comprises a foam layer 12 and specifically, a reticulated polyurethane foam of about 0.06 inch gauge having a density of 1.5 to 1.8 pounds per cubic foot. The foam layer 12 is bonded to a urethane membrane 14 by an adhesive layer 16. The dry thickness of the membrane is about 0.0010 inch. Shown in the FIGURE is a release paper 18 upon which the membrane 14 is originally cast as will be described. Fibers 20 are needle punched into the membrane 14 where they are anchored and extend through the foam layer 12 and extend beyond the same to provide a napped surface. There are approximately 880 punches per square inch and the fibers 20 are 100% polypropylene unimpregnated bright yarns 4 denier.

In the method of the invention the polyurethane membrane 14 is formed by coating a solution of polyether-type polyurethane on the silicone release paper 18 at a dried thickness of approximately 0.001 inch. The preferred polyurethane is Durane 9555, Raffi & Swanson Company, Wilmington, MA. The coated release paper is then passed through a conventional camel-back gas fired oven at between about 225° F. to 250° F. for approximately one minute to cure the film. Subsequently, the cast membrane 14 is coated with approximately 0.25 ounces per square yard of a pressure sensitive acrylic adhesive in a solvent system, a preferred adhesive is Aeroset 1085-45 available from Ashland Chemical Co. The adhesive coating 16 is dried in a gas fired hot oven at a temperature of between about 220° F. to 225° F. for approximately 0.75 minutes.

After the polyurethane membrane 14 has been coated with the adhesive layer, a layer 12 of reticulated polyurethane foam of approximately 0.05–0.07 inch, preferably 0.06 inch, is joined to the adhesive surface 16 of the polyurethane membrane 14, by passing the membrane and foam through pressured nip rolls to form a composite. Subsequently the silicone release paper is stripped from the composite.

After the release paper has been stripped, polypropylene fibers are punched through the composite using a random needle punch machine as well known in the art. The fibers penetrate through the polyurethane foam and are anchored in the membrane.

An aliphatic polyether-type thermosetting polyurethane suitable for the membrane of the invention is formed by reacting an isocyanate with a polyol and a reactive diamine. A number of multifunctional isocyanates can be used to prepare the polyurethane membrane. More particularly, an isocyanate chosen from the group consisting of 2,4 toluene diisocyanate, 4,4 diphenyl methane diisocyanate, isophorone diisocyanate, 2,4 xylene diisocyanate, and 4,4 diiyclohexyl methane diisocyanate is preferred.

Polyols preferred for these isocyanates are esters, ethers or caprolactones. The preferred reactive diamine is triethyl diamine. The viscosity of the aliphatic polyether-type thermosetting polyurethane suitable for use in this invention preferably has a viscosity of approximately 15,000 to 25,000 cps say 20,000 cps and about 22-42% say 32% solids by weight.

Tests were conducted with the composition of the preferred embodiment which supported the superior thermal and moisture vapor transmission characteristics.

Having described the invention, what is now claimed is:

1. A footwear insulating composition which comprises:
   a polyurethane membrane;
   a layer of polyurethane foam adhesively engaged thereto;
   a plurality of fibers secured to the membrane extending through and beyond the foam to form a napped surface, the composition having a moisture vapor transmission factor of from 0.35 to 0.60 and a thermal insulation factor of from R15 to R22.

2. The composition of claim 1 wherein the membrane layer is a flexible thermoset polyurethane.

3. The composition of claim 1 wherein the polyurethane foam is an open cell foam.

4. The composition of claim 1 wherein the urethane foam is a closed cell foam.

5. The composition of claim 1 wherein the fibers are polypropylene.

6. The composition of claim 1 comprising a pressure sensitive thermoset adhesive layer disposed between the membrane and the foam layer to adhesively maintain the same in engagement.

7. The composition of claim 6 wherein the membrane layer is between 0.0008-0.0012 inch.

8. The composition of claim 1 wherein the foam layer is between about 0.05-0.07 inch.

9. The composition of claim 1 wherein the total thickness is between about 0.04-0.08 inch.

10. The composition of claim 1 wherein the urethane is formed from an isocyanate selected from the group consisting of 2,4 toluene diisocyanate, 4,4 diphenyl methane diisocyanate, isophorone diisocyanate, 2,4 xylene diisocyanate, and 4,4 diiyclohexyl methane diisocyanate.

11. A method for producing a laminated material which comprises:
   (a) casting a solution of an aliphatic polyether-type thermoset polyurethane in a dried thickness of between 0.0008 and 0.0012 inch;
   (b) curing said thermoset polyurethane;
   (c) engaging adhesively a layer of foam material to said membrane, the foam material having a thickness of between 0.04-0.08 inch;
   (d) needle punching a plurality of fibers through said foam and into the membrane to anchor the same to the membrane, the fibers extending through the non-engaged surface foam to form a napped appearance, the composition as formed having a thermal insulation factor of between R15 to R22 and a moisture vapor transmission factor of 0.35 to 0.60.

12. The method of claim 11 wherein the polyurethane is formed from an isocyanate selected from the group consisting of 2,4 toluene diisocyanate, 4,4 diphenyl methane diisocyanate, isophorone diisocyanate, 2,4 xylene diisocyanate, and 4,4 dicyclohexyl methane diisocyanate.

13. The method of claim 11 which includes:
   curing the polyurethane at a temperature of between 225° F.-250° F. for approximately 1 minute.

14. The method of claim 11 wherein the needle punched fibers are polypropylene fibers.

15. The method of claims 11 or 14 wherein said fibers are between 2 to 6 denier and are between 600 to 1400 punches per square inch.

16. The method of claim 11 wherein the foam material is a reticulated polyurethane.

17. The composition of claim 1 wherein the polyurethane membrane is a aliphatic polyether-type thermosetting polyurethane, the adhesive is a pressure sensitive acrylic adhesive, the polyurethane foam is a reticulated foam, the membrane layer is between 0.0008-0.0012 inch, the foam layer is between about 0.05-0.07 inch and the fibers are polypropylene fibers between 2 to 6 denier and are between about 600 to 1400 punches per square inch.

* * * * *

UNITED STATES PATENT AND TRADEMARK OFFICE
CERTIFICATE OF CORRECTION

PATENT NO. : 4,515,344

DATED : May 7, 1985

INVENTOR(S) : Thomas E. Coughlin

It is certified that error appears in the above—identified patent and that said Letters Patent is hereby corrected as shown below:

Claim 1 line 1 delete "A footware" and insert therefor -- An --

Claim 2 line 1 delete "layer".

Signed and Sealed this

Nineteenth Day of November 1985

[SEAL]

Attest:

DONALD J. QUIGG

Attesting Officer

Commissioner of Patents and Trademarks